(12) United States Patent
Wimroither

(10) Patent No.: US 6,200,519 B1
(45) Date of Patent: Mar. 13, 2001

(54) WELDING TORCH WITH A CONTACT SOCKET AND A FEED DEVICE

(75) Inventor: Walter Wimroither, Steinbach/Ziehberg (AT)

(73) Assignee: Fronius Schweissmaschinen Produktion GmbH & Co. KG, Pettenbach (AT)

( * ) Notice: Subject to any disclaimer, the term of this patent is extended or adjusted under 35 U.S.C. 154(b) by 0 days.

(21) Appl. No.: 09/171,998

(22) PCT Filed: Apr. 30, 1997

(86) PCT No.: PCT/AT97/00086

§ 371 Date: Oct. 30, 1998

§ 102(e) Date: Oct. 30, 1998

(87) PCT Pub. No.: WO97/41992

PCT Pub. Date: Nov. 13, 1997

(30) Foreign Application Priority Data

May 2, 1996 (AT) .......................................... 248/96

(51) Int. Cl.[7] .................................................. B23K 9/00
(52) U.S. Cl. .............................................. 266/66; 219/136
(58) Field of Search ........................ 266/48, 66; 219/136, 219/137, 137.61, 137.62

(56) References Cited

U.S. PATENT DOCUMENTS

| 1,959,180 | | 5/1934 | Stephens . | |
| 2,347,646 | * | 5/1944 | Smith | 219/137.61 |
| 2,366,068 | * | 12/1944 | Sohn | 219/136 |
| 3,038,059 | * | 6/1962 | Hinrichs | 219/136 |
| 3,112,393 | | 11/1963 | Mantz et al. . | |
| 3,576,423 | * | 4/1971 | Bernard | 219/136 |
| 4,731,518 | | 3/1988 | Parmelee et al. . | |

FOREIGN PATENT DOCUMENTS

| 3304996 | | 8/1984 | (DE) . |
| 286 123 | | 7/1989 | (DE) . |
| 4410370 | | 9/1995 | (DE) . |
| 2349389 | | 11/1997 | (FR) . |
| 2074069 | * | 10/1981 | (GB) . |

* cited by examiner

Primary Examiner—Scott Kastler
(74) Attorney, Agent, or Firm—Collard & Roe, P.C.

(57) ABSTRACT

The invention concerns a welding torch with a contact socket and a feed device. The feed device is arranged to hold a welding rod and guides the welding rod obliquely relative to a bore in the contact socket such that an outer surface of the welding rod abuts a defined inner surface of the bore at least over a partial region of the bore.

22 Claims, 7 Drawing Sheets

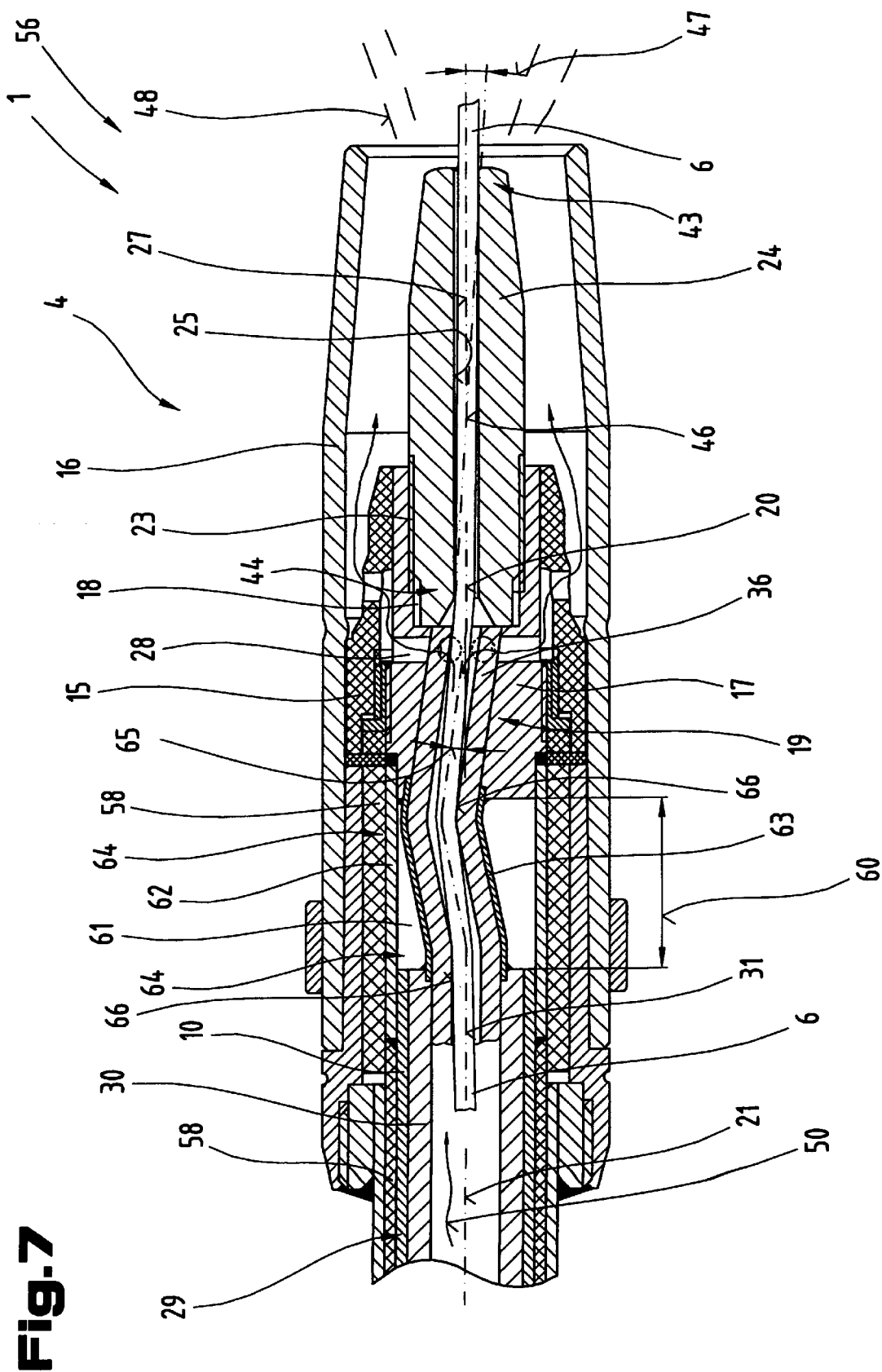

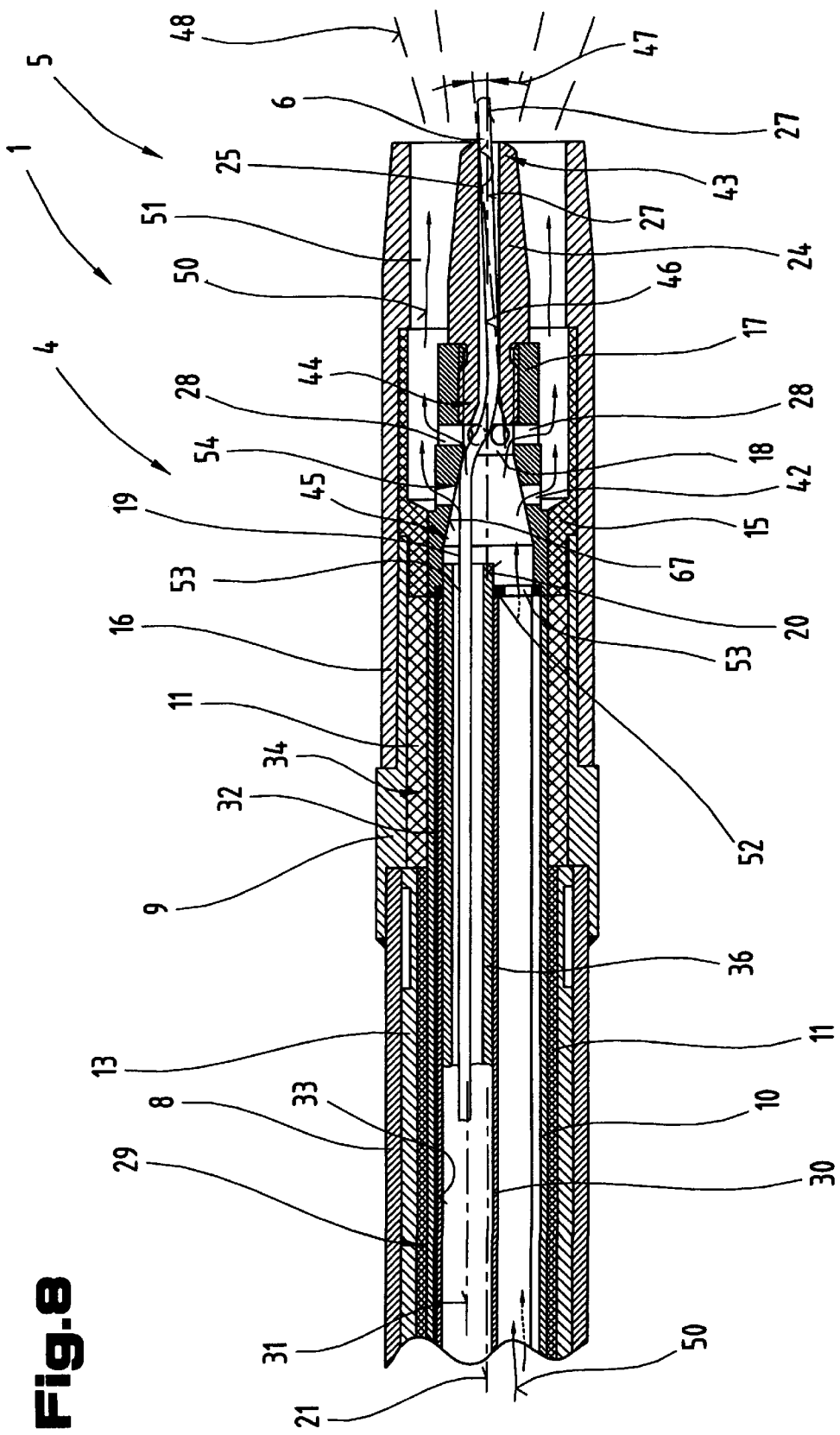

WELDING TORCH WITH A CONTACT SOCKET AND A FEED DEVICE

The invention relates to a welding torch with a contact socket and a feed device.

Many different types of welding torches with contact sockets are known, in connection with which forced contacting of the welding wire with the contact socket is achieved through a special design of the contact socket. According to DE 44 10 370 A1, for example, forced contacting of the welding wire with the contact socket is known, where the contact socket has a recess extending over part of its length, and a contact element adapted to the recess is inserted in the latter. The contact element is pressed against the welding wire via spring tension, so that forced contact of the contact element with the welding wire takes place. The drawback in this connection is that high manufacturing expenditure and thus high costs are incurred in the manufacture of the contact socket, and that flawless contacting is not assured when the spring tension is reduced.

The present invention is based on the problem of creating a welding torch with a contact socket and a feed device in connection with which forced contacting of the welding rod with the contact socket takes place, whereby it is possible to employ commercially available contact sockets.

Said problem of the invention is solved with the a welding torch having a centrally extending longitudinal axis and comprising a contact socket defining a longitudinally extending bore having a center axis and a feed device for a welding rod extending to the contact socket. According to this invention, the feed device has a centrally extending longitudinal axis extending parallel to the centrally extending longitudinal axis of the welding torch and is offset therefrom and from the center axis of the contact socket, so that the feed device deflects the welding rod transversely to the contact socket bore, preferably being deformed obliquely relative to the center axis of the contact socket towards the centrally extending longitudinal axis of the welding torch to deflect the welding rod transversely to the contact socket bore. The surprising advantage of this apparently simple solution lies in the fact that a defined area of contact is created in the contact socket by feeding the welding wire to the bore of the contact socket at an angle, so that the welding wire is forced to come into contact with the contact socket. Another unforeseeable advantage lies in the fact that forced contacting of the welding wire with the contact socket is always assured when a welding wire with low dressing and/or spring constant is used.

Providing a transition piece is advantageous because it assures a seamless transition of the welding rod from the feed device into the contact socket.

BRIEF DESCRIPTION OF THE DRAWINGS

The invention is explained in greater detail in the following with the help of the exemplified embodiments shown in the drawings, in which:

FIG. 7 shows a side view of a part zone of the welding torch according to FIG. 6, by a sectional and a simplified schematic representation; and FIG. 8 shows a part zone of another embodiment of the welding torch by a sectional side view.

FIGS. 1 to 3 show a welding torch 1, for example for MIG/MAG-welding, whereby welding torch 1 is designed for a welding robot.

Figure 3:
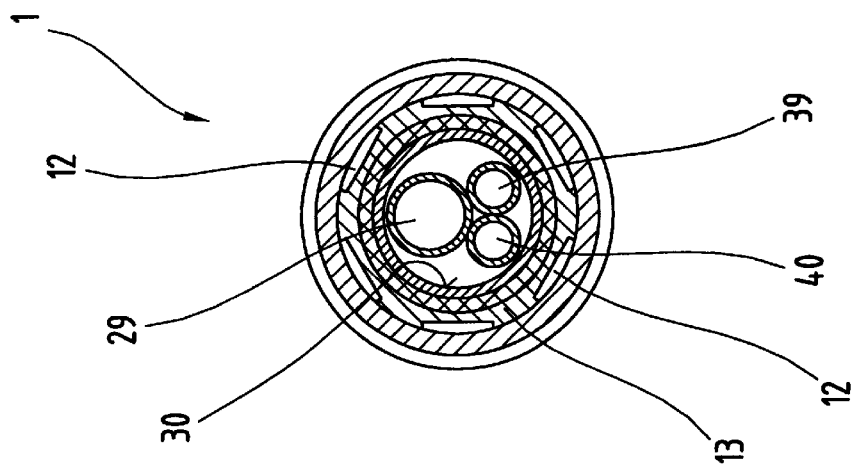
FIG. 3 shows a front view of the welding torch by a sectional and a simplified schematic representation.

Welding torch 1 consists of a supply piece 2, by means of which welding torch 1 is connected via a hose package to a welding apparatus or welding current source, said piece at the same time having the function of conducting the current from the welding apparatus or welding current source into welding torch 1. An insulating ring 3 is arranged adjoining supply piece 2, so that the front part of welding torch 1 is insulated against supply piece 2 and thus no current can flow on the outer surfaces of welding torch 1. The current conducted via supply piece 2 to welding torch 1 is conducted within an outer jacketing 4 to the end zone 5 of welding torch 1, and transmitted from end zone 5 to a welding rod 6.

Outer jacketing 4 may be formed here by a plurality of individual parts 7 to 9, whereby outer jacketing 4 is preferably designed in the form of a steel tube. In this connection, welding torch 1 can be secured on an arm of a welding robot by means of individual part 7, for which provision is made.

Figure 2:
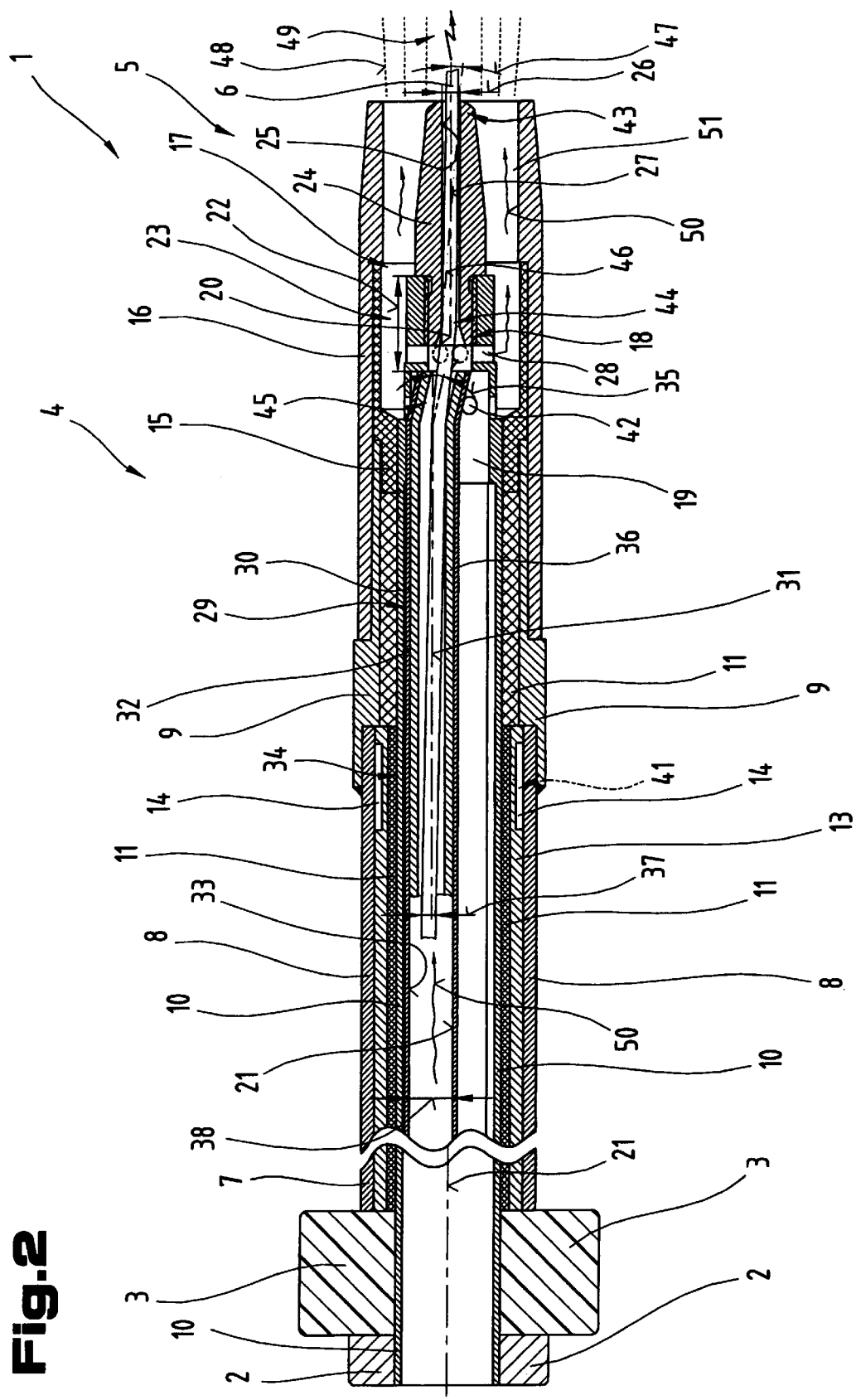
FIG. 2 shows a side view of the welding torch according to FIG. 1, by a sectional and a simplified schematic representation.

Now, as shown more clearly in FIG. 2, supply piece 2 is connected or contacted with a supply tube 10, so that when welding torch 1 is connected to the welding apparatus or welding current source, the current is passed on to supply tube 10 via supply piece 2. Supply tube 10 may be formed, for example by a cuppertube. An insulating layer 11, which extends from insulating ring 3 to end zone 5 of welding torch 1, is now applied to supply tube 10, so that supply tube 10 is externally completely surrounded by said insulating layer 11. It is, of course, possible to put an insulating tube over supply tube 10 instead of using insulating layer 11.

In order to achieve superior cooling of welding torch 1 it is possible, for example to arrange a cooling tube 13 provided with individual grooves 12 extending in the longitudinal direction on insulating layer 11 over a part area of welding torch 1, which permits better cooling of welding torch 1 or outer jacketing 4. In the end zone, cooling tube 13 has a groove 14 extending across its circumference, so that the water or air pressed into the individual grooves 12, in particular into each second groove 12, can exit again via the remaining grooves 12. Outer jacketing 4 is now arranged on cooling tube 13 or insulating layer 11, so that firm support is produced for the individual layers or tube structures. In the end zone, individual part 9 of outer jacketing 4 has an inside thread, so that an insulating piece 15 having a thread on its outer side can be secured. Subsequently, a gas nozzle 16 can be mounted via insulating piece 15 and a part zone of individual part 9.

Furthermore, in end zone 5 of welding torch 1, a transition piece 17 is connected with supply tube 10. Transition piece 17 can be joined with supply tube 10 by soldering, welding, gluing or screwing. Transition 17 has in this connection two different bores 18, 19. With its center axis 20, which extends in the center of bore 18, bore 18 is positioned aligned with a longitudinal center axis 21 extending in the center of welding torch 1. Bore 18 of transition piece 17 extends in this connection over a part zone 22 of transition piece 17, whereby an inside thread 23 is arranged in bore 18, extending over the entire length or over a part length of said bore. A contact socket 24 can be screwed into said bore 18. Contact socket 24 in turn has a bore 25 with a diameter 26 adapted to the outer circumference of welding rod 6. A center axis 27 extending in the center of bore 25 is aligned with the longitudinal center axis 21 of welding torch 1 or the center axis 20 of transition piece 17.

The function of contact socket 24 is to transmit to welding rod 6 the current transmitted from supply piece 2 via supply tube 10 to transition piece 17, and from the latter to contact socket 24, as shown schematically, so that the current transfer to welding rod 6 takes place as close as possible to the welding site. Furthermore, transition piece 17, particularly within the region of bore 18, has individual bores 28 extending over the circumference and directed at the center. It is, of course, possible to form transition piece 17 by a plurality of individual components, which subsequently can be joined to form one single piece.

Furthermore, a feed device 29 is arranged in welding torch 1, said device being formed, for example by a copper tube 30. Copper tube is arranged here in such a way that a symmetry axis 31 extending in the center of copper tube 30 is arranged parallel with the longitudinal center axis 21 of welding torch 1, i.e., that copper tube 30 is displaced from the center of welding torch 1, so that, for example, a surface 32 of copper tube 30 is contacted with an inside surface 33 of supply tube 10, forming in this manner a contact area 34. Furthermore, feed device 29 projects into bore 19 of transition piece 17.

In end region 5, thus in the region where copper tube 30 feeds into transition piece 17, copper tube 30 of feed device 29 is angled by an angle 35 in the direction of longitudinal center axis 21, so that when welding rod 6 is inserted in feed device 29 it is deflected in such a manner that welding rod 6 is deflected into the bore 25 of contact socket 24.

It is possible in this connection that for guiding welding rod 6, a guiding device 36—which, for example, may be formed by a coil spring—is pushed into feed device 29 for guiding welding rod 6. This offers the advantage that welding rod 6 is guided in feed device 29 with more precision because an outer encasing 37 of welding rod 6 has a substantially smaller diameter than an inside diameter 38 of feed device 29. In this connection, guiding device 36 has an inside diameter that is equal to or greater than the one of outer encasing 37 of welding rod 6. It is assured in this way that by simply exchanging guiding device 36, welding torch 1 can be used for different welding rods 6 with different outer encasings 37 of welding rod 6. However, for this purpose contact socket 24 has to be adapted to the given rod diameter or to outer encasing 37 of welding rod 6, i.e., when a thicker welding rod 6 is used, it is necessary to use a contact socket 24 where diameter 26 of bore 25 conforms to or is greater than outer encasing 37 of welding rod 6.

Furthermore, one or a plurality of additional tubes 39, 40 may be arranged in the interior of supply tube 10, whereby such additional tubes may abut surface 32 of feed device 29 and inside surface 33 of supply tube 10. It is possible to use for this purpose, for example additional tube 39 for preliminary water circulation, and additional tube 40 for feeding compressed air. In this connection it is possible, for example, to extend additional tube 39 over a part zone of welding torch 1, whereby when additional tube 39 is employed as a preliminary water circulation, said tube ends with cooling tube 13, so that a connecting tube 41 can be arranged, as shown by a broken line, via bore between additional tube 39 and circumferential groove 14. By arranging connecting tube 41 it is possible to feed water in the interior, thus within supply tube 10 for cooling welding torch 1, and to convey such water via connecting tube 41 from additional tube 39 to circumferential groove 14 of cooling tube 13, so that a return flow of water is produced in the individual grooves 12 of cooling tube 13.

Furthermore, it is possible with additional tube 39 to form in the interior of supply tube 10 its own cooling circuit, whereby additional tube 39 ends for said purpose within the region of transition piece 17. Additional tube 39 then has to be insulated against additional tube 40, i.e., a separation wall has to be formed around the additional tube 40, so that when the cooling liquid exits from additional tube 39 it cannot penetrate the additional tube 40 and the feed device 29. The cooling liquid subsequently flows back to the end of welding torch 1 outside of additional tube 39, thus in supply tube 10.

The additionally arranged tube 40 may be a feed device for automatically cleaning gas nozzle 16, i.e., dirt particles forming in the welding bath and collecting in gas nozzle 16 are blown out again by simple compressed air. Additional tube 40 ends in this connection within the region of transition piece 17, so that when compressed air is blown into additional tube 40, such compressed air is received in bore 19 of transition piece 17. On the circumference of transition piece 17, provision is made within the zone of bore 19 for outlet openings 42, so that the compressed air can flow from bore 19 via outlet openings 42 to the outside and thus to gas nozzle 16, and the dirt particles are blown out from there in the direction of contact socket 24.

Now, when a welding operation has to be carried out with welding torch 1, a welding rod 6 is automatically inserted from the welding apparatus into guiding device 36, i.e., welding rod 6 is admitted from a supply container via a feed line into welding torch 1, so that welding rod 6 is conveyed to contact socket 24 along feed device 29. Due to the fact that feed device 29 is arranged outside of the longitudinal center axis 21 of welding torch 1, feed device 29 has to be angled in end zone 5 by angle 35, so that welding rod 6 is reversed in end zone 5 in such a way that welding rod 6 can flawlessly enter bore 25 of contact socket 24 or bore 18 of transition piece 17.

By feeding welding rod 6 to bore 25 of contact socket 24 at an angle, at least one permanently defined contact area 43 is created within contact socket 24 because welding rod 6 is always deflected on the surface of bore 25 of contact socket 24 in the direction of center axis 27 of bore 25. However, it is possible in this connection to create within the region of the inlet to bore 25 an additional contact area 44 because of a bend 45 produced in welding rod 6. Now, connecting the two contact areas 43, 44 one obtains a straight line 46 represented by a dot-two-dash-line. Straight line 46 resulting from the two contact areas 43, 44 has an angle 47 relative to longitudinal center axis 21 and thus relative to center axis 27 of bore 25. Forced contacting of welding rod 6 with contact socket 24 is achieved by said angular arrangement of welding rod 6 or by the bend of welding rod 6 caused by such arrangement in the end zone 5 of feed device 29.

This has the advantage that a flawless transition of current between contact socket 24 and welding rod 6 is assured owing to the permanent connection of welding rod 6 with contact socket 24, and thus forced contacting even when a welding rod 6 with low dressing or a low spring constant is used, because at least one defined contact area 43 is always produced in contact socket 24 by feeding the welding core to contact socket 24 in an oblique way, or at an angle.

Another advantage of the oblique feed of welding rod 6 to contact socket 24 lies in the fact that due to the creation of the defined contact area 43 within the range of the welding site or in contact socket 24, the rod resistance of welding rod 6 remains constant and controlling of the welding process is enhanced.

In a welding operation with welding torch 1 as defined by the invention, in particular for a MIG/MAG-welding process, a protective gas cover 48 has to be built up around welding rod 6, so that access of oxygen is prevented, and so that a flawless welding process can be carried out by an electric arc 49 as schematically shown by an arrow. For such welding process, a gas 50, in particular a protective gas is admitted by feed device 29 to transition piece 17 as schematically shown by arrows, i.e., gas 50 and welding rod 6 are simultaneously fed to contact socket 24 by feed device 29. In transition piece 17, gas 50 can exit through bores 28 into an interior space 51 of gas nozzle 16, so that protective gas cover 48 can be formed around welding rod 6 within the range of electric arc 49.

It is advantageous in connection with such feed of gas 50 that a gas 50 also flows simultaneously into bore 25 of contact socket 24 and thereby forms an airtight atmosphere for welding rod 6, so that corrosion in bore 25 is prevented and very good current transfer from contact socket 24 to welding rod 6 is always obtained.

Figure 4:
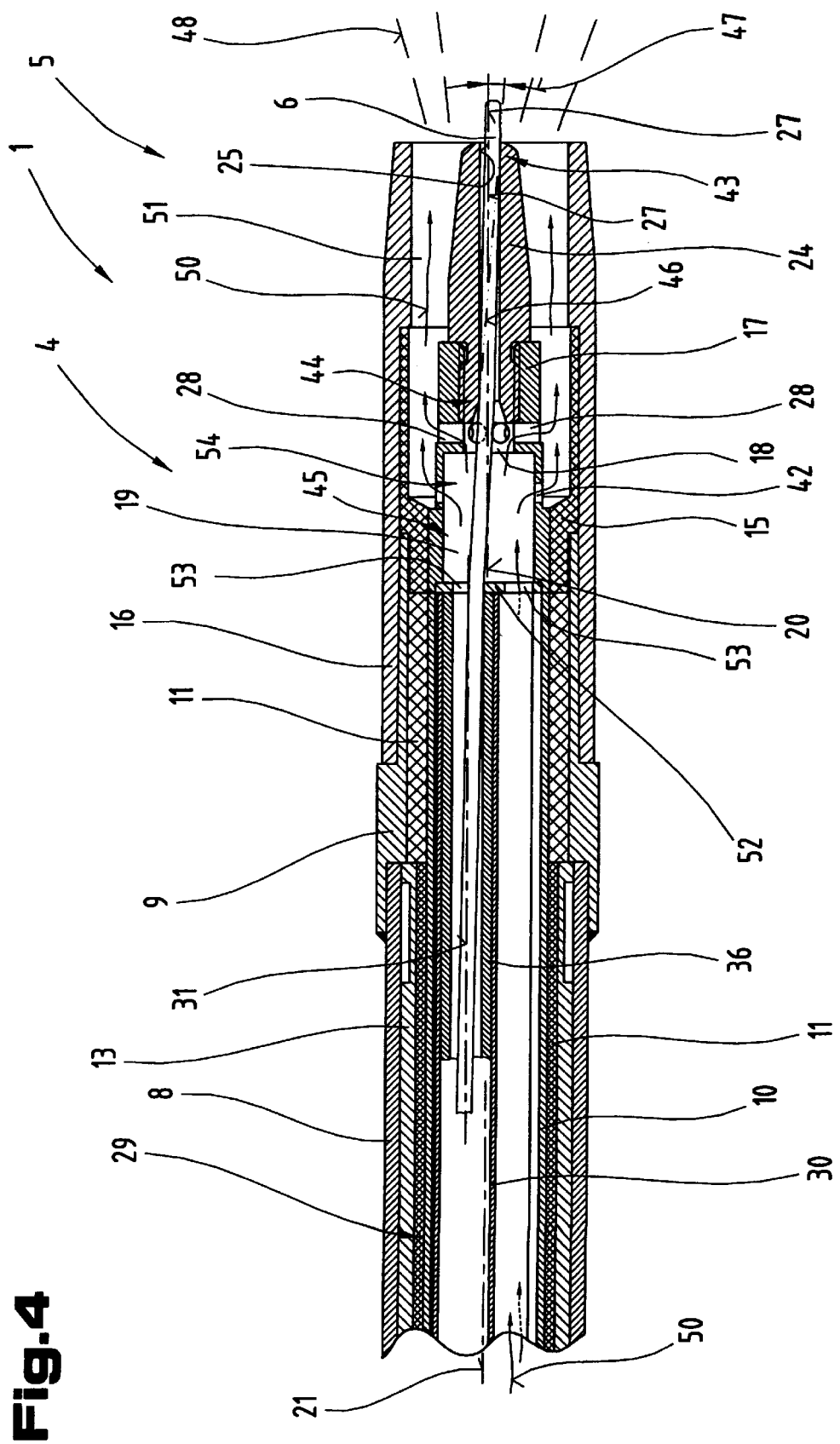
FIG. 4 shows a part zone of another embodiment of the welding torch by a sectional side view.

Now, FIG. 4 shows another exemplified embodiment of welding torch 1 for feeding welding rod 6 to contact socket 24, whereby identical reference numerals are used for identical components. In the exemplified embodiments of welding torch 1 shown, end zone 5 is shown on an enlarged scale.

Figure 1:
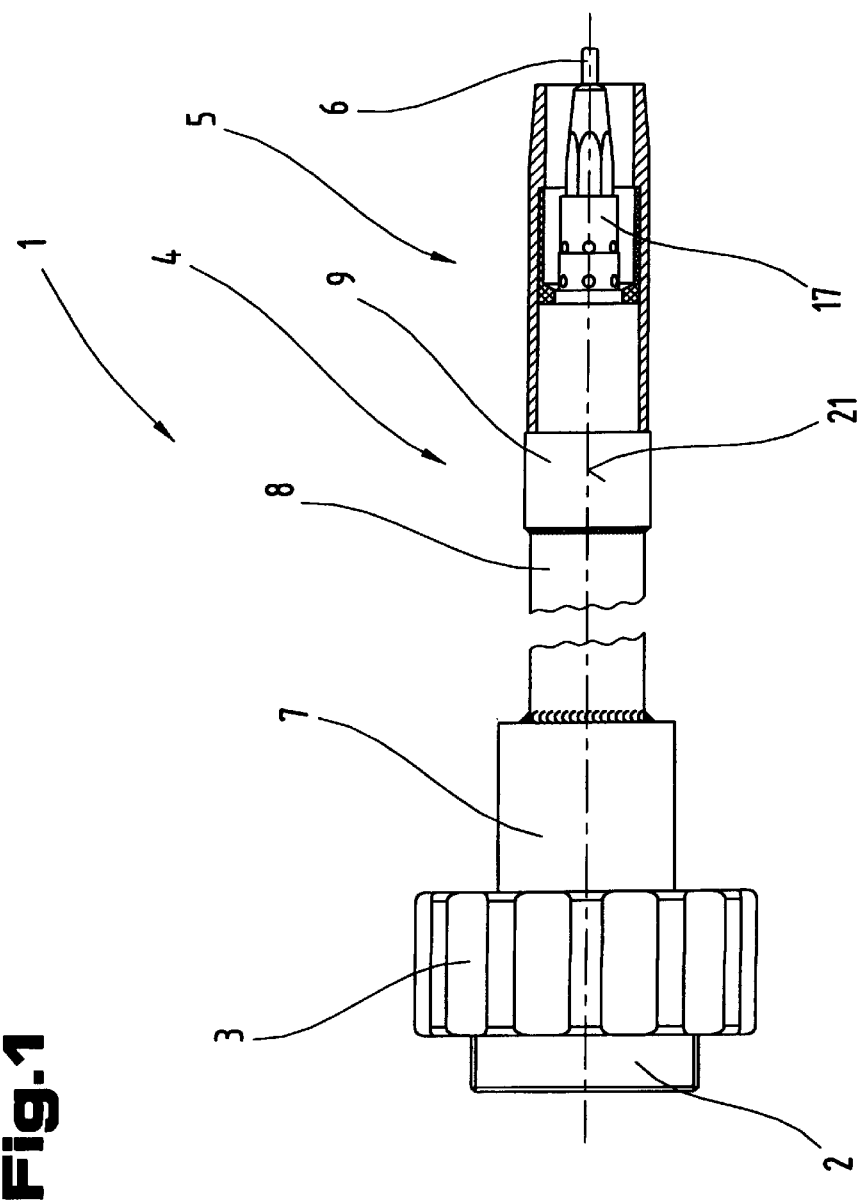
FIG. 1 shows a side and partly sectional view of a welding torch as defined by the invention.

Welding torch 1 is again formed in said figure by supply tube 10 with layers disposed around the latter on the outside as described for FIGS. 1 to 3. Feed device 29 is here not extending up to bore 18 of transition piece 17 but ending on bore 19 of transition piece 17. For this purpose, a closing plate 52, for example, can be arranged on bore 19. Closing plate 52 has bores 53 for the individual tubes arranged in supply tube 10, in particular of feed device 29 and additional tubes 39, 40 as described for FIG. 1, in order to convey the respective media such as, for example gas 50 to transition piece 17.

By arranging closing plate 52, what is achieved, furthermore, is that guiding device 36 ends at closing plate 52 as well, so that welding rod 6 is freely disposed or not guided from closing plate 52 to an inlet opening 54 of bore 18 of transition piece 17, whereby feed device 29 is again arranged, as described for FIG. 1, with its symmetry axis 31 parallel with longitudinal center axis 21 of welding torch 1. Due to the fact that feed device 29 is ending in the head zone of transition piece 17, automatic admission of welding rod 6 into bore 25 of contact socket 24 is no longer possible, so that when welding torch 1 is put into operation, welding rod 6 has to be inserted in bore 25 of contact socket 24 by hand.

For this purpose, contact socket 24 is unscrewed from transition piece 17, so that with automatic feed of the welding rod, welding rod 6 is fed until the end of welding rod 6 is received outside of transition piece 17 or outside of gas nozzle 16, whereupon the user can subsequently screw contact socket 24 to transition piece 17 by plugging contact socket 24 to welding rod 6. By screwing contact socket 24 to transition piece 17, welding rod 6 is deformed in such a way that forced contacting of welding rod 6 on the surface of bore 25 is achieved. Such deformation of welding rod 6 in turn effects that the defined contact areas 43, 44 are created in this way in contact socket 24, Now, when the two contact areas 43, 44 are again joined, straight line 46 is obtained, which is represented by a dot-two dash-line, whereby the latter again forms angle 47 relative to longitudinal center axis 21 extending in the center of welding torch 1 or relative to center axis 27 of bore 25. It is noted in this regard that with its center axis 27, contact socket 24 again is arranged aligned with longitudinal center axis 21 of welding torch 1.

What is accomplished by such reversing of welding rod 6 is that a constant defined contact of welding rod 6 with contact socket 24 is produced, thus forced contacting of welding rod 6. This is advantageous because a flawless current transfer is created on welding rod 6 for the welding current, which is received by contact socket 24 via supply tube 10. Another advantage lies in the fact that controlling of the welding process is distinctly enhanced by the formation of the defined or preset contact area 43 or 44.

In this variation of the embodiment of the invention, welding torch 1 is now designed in such a way that gas 50 is no longer fed to transition piece 17, for example via feed device 29, but gas 50 is supplied to transition piece 17 by way of the additional tubes 39, 40. In this connection, gas 50 again exits from closing plate 52 via bores 53, so that in bore 19 of transition piece 17, gas 50 forms a protective shield around welding rod 6, and can flow via bores 28 or via outlet openings 42 of bore 19 into the interior space 51 of gas nozzle 16 and thus form protective gas cover 48 around welding rod 6. It is, of course, possible, for example upon completion of the welding process, to admit compressed air to additional tubes 39, 40, so that cleaning of gas nozzle 16 or of bore 19 is possible as well.

Figure 5:
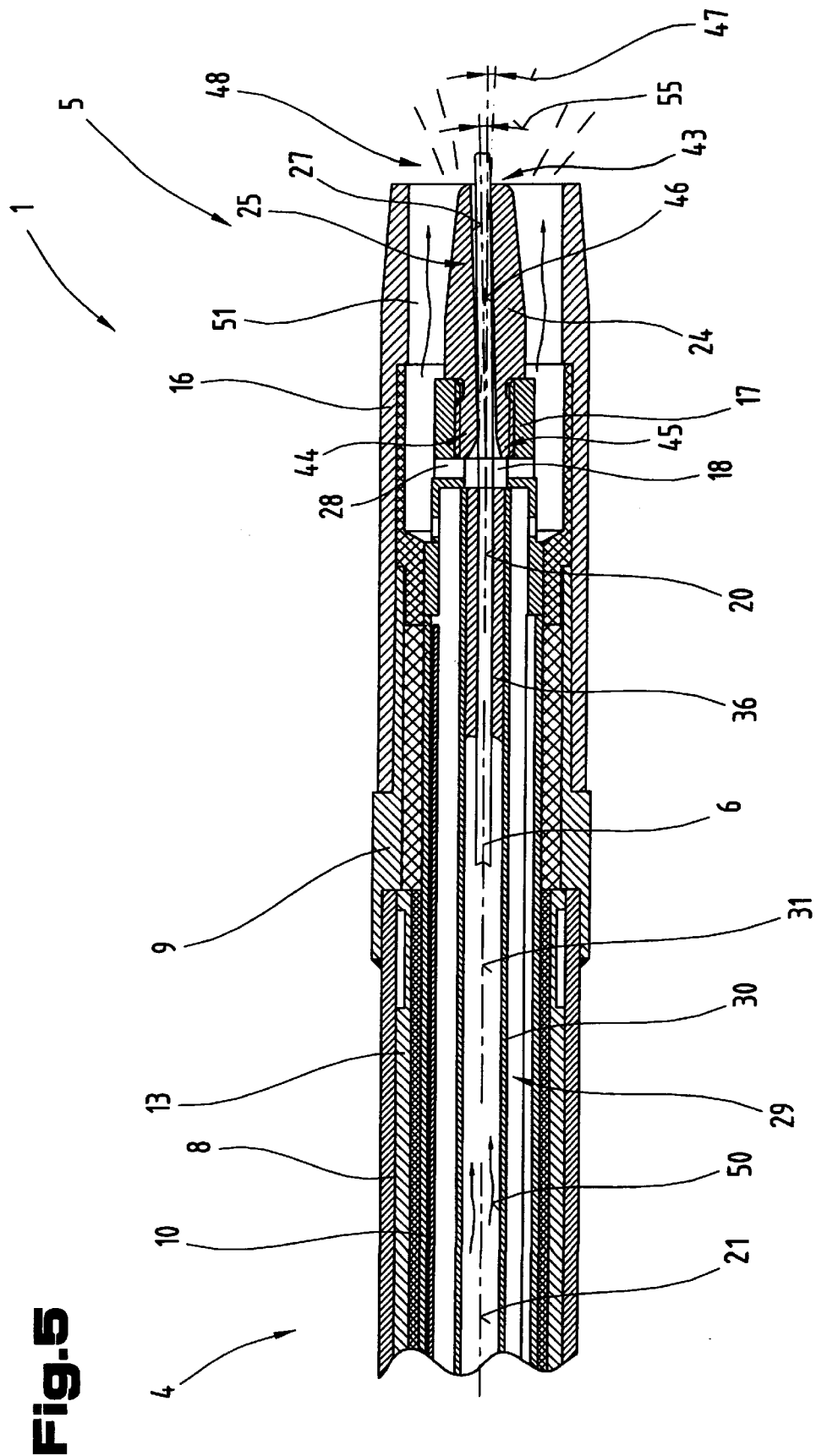
FIG. 5 shows a part zone of another embodiment of the welding torch by a sectional side view.

FIG. 5 shows another embodiment of the welding torch 1 as defined by the invention, whereby again only end zone 5 of welding torch 1 is shown, and identical reference numerals are used for identical components in the figures described above.

With the welding torch 1 shown here, feed device 29, in particular copper tube 30 is now arranged in the center of welding torch 1. In this connection, symmetry axis 31 of feed device 29 is arranged aligned with the longitudinal center axis 21 of welding torch 1. Feed device 29 again extends up to the bore 18 of transition piece 17, so that welding rod 6 arranged in feed device 29 can be directly fed by feed device 29 into bore 18 of transition piece 17. It is, of course, possible that feed device 29 ends on transition device 17.

Center axis 20 of bore 18 of transition piece 17 is arranged aligned with longitudinal center axis 21 or symmetry axis 31 of feed device 29. When contact socket 24 is now screwed into transition piece 17, contact socket 24 is arranged in the center of welding torch 1.

Bore 25 in contact socket 24 is now designed oblique, so that center axis 27 of bore 25 has an angle 55 relative to center axis 20 of bore 18 or relative to longitudinal center axis 21 of welding torch 1.

What is accomplished again with such oblique design of bore 25 is that the defined contact areas 43, 44 are formed in bore 25 by welding rod 6. Now, when the two defined contact areas 43, 44 are now connected via the straight line 46 represented by the dot-two-dash-line, straight line 46 has angle 47 relative to center axis 20 or bore 18 or to longitudinal center axis 21 of welding torch 1.

What is accomplished with such oblique design is that a constantly fixed friction area is obtained on contact socket 24, such friction area corresponding with the defined contact areas 43, 44, so that the current transfer from contact socket 24 to welding rod 6 is always assured.

It is possible, of course, for example to arrange bore 25 in contact socket 24 not at an angle but to arrange it outside of the center of contact socket 24, so that welding rod 6 is again threaded into bore 25 and welding rod 6 is thus deflected upon exiting from guiding device 36 in such a way that the contact areas 43, 44 are formed in contact socket 24.

It is possible, furthermore, to arrange contact socket 24 outside of the center of welding torch 1, thus parallel with longitudinal center axis 21, so that welding rod 6 is reversed in this way when entering bore 25 of contact socket 24, which again creates in contact socket 24 at least one or two or more defined contact areas 43, 44. Of course, it is possible also to arranged feed device 29 and contact socket 24 at an angle relative to each other, which again creates the defined contact areas 43, 44 by welding rod 6.

In a welding process, gas 50 is admitted again via feed device 29 as described in connection with FIGS. 1 to 3, so that gas 50 can exit via bores 28 into interior space 51 of gas nozzle 16, and so that protective gas cover 48 can be produced around welding rod 6.

Of course, it is possible to again arrange in this embodiment additional tubes 39, 40 in the interior of supply tube 10, so that such additional tubes again can be used for cleaning gas nozzle 16 or for a cooling circuit.

Furthermore, for the purpose of obtaining an exact position of the defined contact area 43, 44 in contact socket 24, it is possible to design contact socket 24 with a snap closure, so that an exact position of welding rod 6 is defined.

Figure 6:
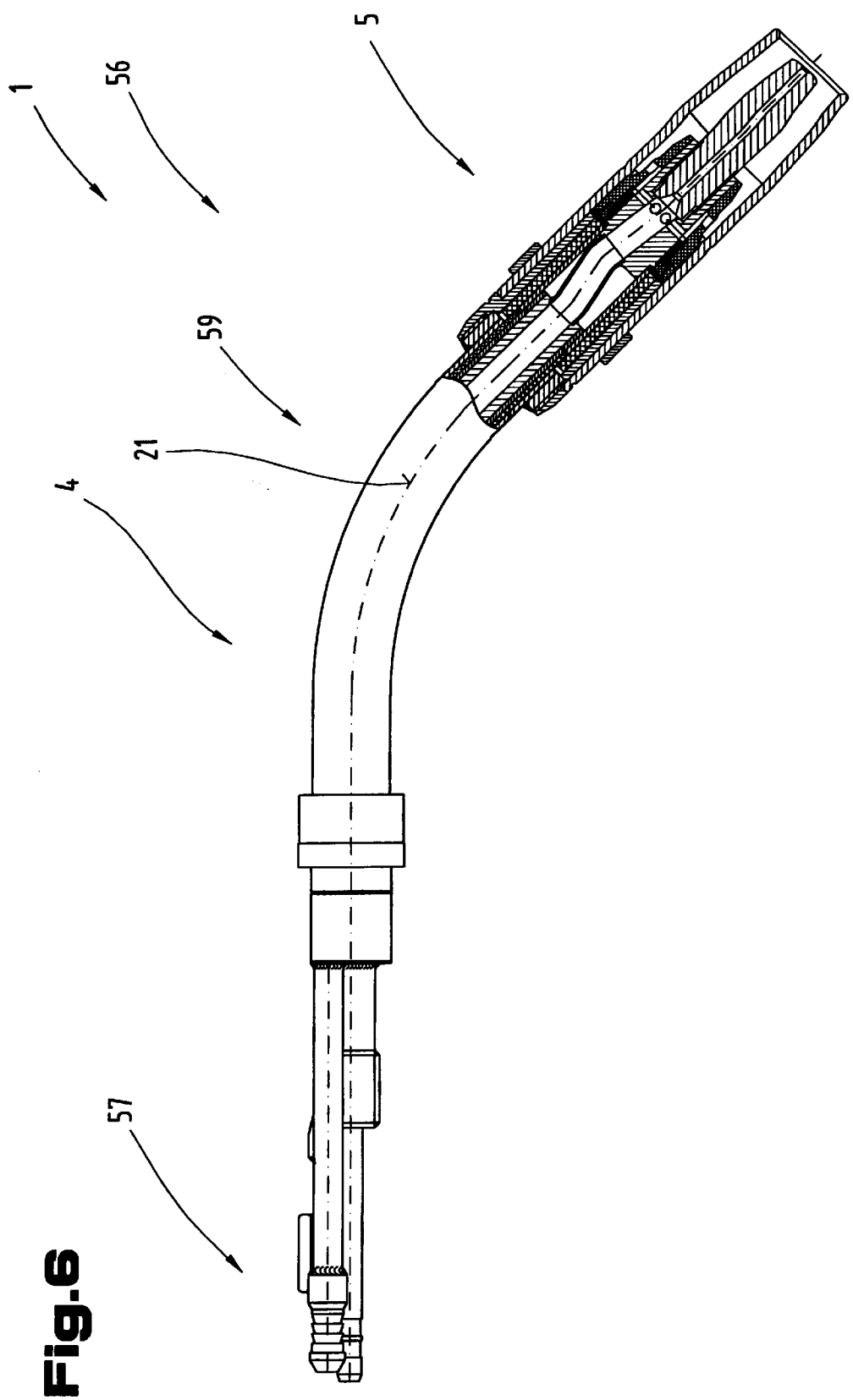
FIG. 6 shows a manual welding torch by a side and partly sectional view.

FIGS. 6 and 7 show another embodiment of welding torch 1, in particular a hand welding torch 56 for a welding apparatus, whereby the same reference numerals are used for identical parts in the figures described in the foregoing.

Hand welding torch 56 has a connection device 57 for connecting hand welding torch 56 to the cables of the welding apparatus. Hand welding torch 56 is supplied with current and voltage via connection device 57, as well as with welding rod 6 and gas 50, whereby hand welding torch 56 is insulated against outer jacketing 4 by insulating layers 58, so that hand welding torch 56 can be used by a user without danger.

It can be seen in the shown exemplified embodiment that hand welding torch 56 has a curvature 59 in end zone 5, which provides for better handling of hand welding torch 56 for manual welding.

In the shown embodiment, supply tube 10 is arranged in the center, so that symmetry axis 31 of supply tube 10 again extends aligned with longitudinal center axis 21 of welding torch 1, in particular of hand welding torch 56. Supply tube 10 ends with a spacing 60 from transition piece 17, so that a hollow space 61 is created between the end of supply tube 10 and the transition piece 17. So that the current can now flow from supply tube 10 to transition piece 17, a connection tube 62 is put over the outer surface of supply tube 10 as well as over the outer surface of transition piece 17, so that a perfect contact is created between supply tube 10 and transition piece 17. Connection tube 62 can be joined here with supply tube 10 and transition piece 17 by welding or soldering.

Feed device 29, which is formed by copper tube 30, is arranged again in supply tube 10, whereby no additional tubes 39, 40 are arranged in this exemplified embodiment in the interior of supply tube 10. Feed device 29, in particular copper tube 30 again ends here with the end of supply tube 10, whereby copper tube 30 can be welded, for example to supply tube 10 in order to prevent displacement of copper tube 30.

Now, to assure smooth transition from copper tube 30 to transition piece 17, an intermediate piece 63 is arranged in hollow space 61. Intermediate piece 63 again can be welded to copper tube 30 of feed device 29 and to transition piece 17, in particular bore 19 of transition piece 17.

Again, in order to obtain flawless contact of welding rod 6 in contact socket 24 adjoining transition piece 17, intermediate piece 63 has a bend 64, so that when welding rod 6 is fed via feed device 29 it is deflected from the center of hand welding torch 56. In the region of transition piece 17, intermediate piece 63 is again set at an angle in the direction of longitudinal center axis 21 by another end 64.

Smooth feeeding into bore 19 of transition piece 17 is achieved with said angle, whereby bore 19 of transition piece 17 is arranged with an angle 65 relative to center axis 20 of bore 18, so that a seamless transition is obtained between intermediate piece 63 and bore 19. Bore 18 of transition piece 17 is again arranged aligned with longitudinal center axis 21 of hand welding torch 56, whereby an inside thread 23 may be arranged again in bore 18, so that contact socket 24 can be screwed into bore 18.

Contact socket 24 has bore 25, whereby the latter is arranged aligned with longitudinal center axis 21 of hand welding torch 56 and thus extends aligned with center axis 20 of bore 18.

With the hand welding torch 56 shown here, it is possible to arrange guiding device 36 in feed device 29, whereby guiding device 36 again can be pushed up to bore 18 of transition piece 17, which is shown again schematically.

Now, when welding rod 6 is inserted into guiding device 36, welding rod 6 extends along longitudinal center axis 21 up to the end of supply tube 10. When changing into intermediate piece 63, welding rod 6 is moved away from longitudinal center axis 21 and subsequently extends in the direction of outer jacketing 4, which creates several contact areas 66 within the region of the end of supply tube 10 or end of feed device 29. Subsequently, welding rod 6 is deflected in the zone of transition between intermediate piece 63 and bore 19 in the direction of longitudinal center axis 21, so that a contact area 66 is again created within the zone of transition between intermediate piece 63 and bore 19 of transition piece 17. Subsequently, welding rod 6 is fed into bore 25 of contact socket 24, so that welding rod 6 is deflected on the surface of bore 25 and the defined contact areas 43, 44 are thus formed in contact socket 24. Forced contacting is achieved by such deflection of welding rod 6, which creates a flawless transfer of current from contact socket 24 to welding rod 6. Now, if the two contact areas 43, 44 are connected via straight line 46, which is represented by a dot-two-dash-line, straight line 46 has angle 47 relative to center axis 20 of bore 18.

The advantage of such deflection of welding rod 6 lies in that when a welding rod 6 is used, at least one permanent contact area 43 or 44 is created in contact socket 24 and thus a continuous transfer of current to welding rod 6 is assured.

So that the welding process can be carried with hand welding torch 56, gas 50 is conducted via feed device 29 to transition piece 17, as again schematically shown by an arrow. Gas 50 can subsequently flow via bore 28 into interior space 51 of gas nozzle 16, so that protective gas cover 48 can be produced for welding rod 6 at the end of gas nozzle 16.

It is possible, furthermore, to use hollow space 61 for a cooling circuit, whereby, for example, copper tube 30 of feed device 29 may have ribs, so that an inlet and an outlet is created for the cooling medium.

Now, FIG. 8 shows another exemplified embodiment of welding torch 1 for feeding welding rod 6 to contact socket 24 extending in the center of longitudinal center axis 21, whereby identical reference numerals are used for identical parts. End zone 5 is shown in the represented exemplified embodiments of welding torch 1 on an enlarged scale.

Welding torch 1 is again formed by supply tube 10 with the layers disposed around the latter on the outside, as described in connection with FIGS. 1 to 7. In welding torch 1, feed device 29 is again arranged in such a way that symmetry axis 31 extending in the center of feed device 29 is arranged parallel with longitudinal center axis 21 of welding torch 1, i.e., that feed device 29 is displaced from the center of welding torch 1, so that, for example, surface 32 of copper tube 30 comes into contact with inside surface 33 of supply tube 10, thus forming a contact area 34.

A surface 67 extending at an angle relative to longitudinal center axis 21 is now formed in the zone of transition between bore 18 and bore 19, whereby said surface extends tapered from bore 19 to bore 18, thus in the direction of contact socket 24. of course, it is possible that in such an exemplified embodiment, transition piece 17 is now formed only by bore 18 and the obliquely extending surface 67, so that bore 19 in transition piece 17 can be omitted and transition piece 17 thus ends with surface 67. Furthermore, it is possible that transition piece 17 is formed only by bore 18, whereby another structural component with the obliquely extending surface 67 is arranged in front of bore 18.

Feed device 29 now extends not up to bore 18 of transition piece 17 but ends in front of or directly on surface 67, i.e., if surface 67 is arranged between bores 18, 19 of transition piece 17, feed device 29 may project into bore 19.

For this purpose, closing plate 52 can be arranged again on bore 19. Closing plate 52 has bores 53 for the individual tubes arranged in supply tube 10, in particular of feed device 29 and of the additional tubes 39, 40 as described for FIG. 1, in order to conduct the respective media such as, for example gas 50 to transition piece 17.

The bore in closing plate 52 for feed device 29 can be designed in this connection in such a way that feed device 29 can be pushed through said bore into bore 19. However, it is possible also that feed device 29 already ends on closing plate 52 because due to the arrangement of angled surface 67, welding rod 6 or guiding device 36 are deflected in the direction of bore 18 and automatic insertion of welding rod 6 in bore 25 of contact socket 24 is achieved in this way.

Now, when a welding operation is to be carried out with welding torch 1, a welding rod 6 is automatically inserted in guiding device 36 by the welding apparatus, i.e., welding rod 6 is inserted in welding torch 1 from a supply container via a feed line, so that welding rod 6 is conveyed along feed device 29 to contact socket 24. Due to the arrangement of feed device 29 outside of longitudinal center axis 21 of welding torch 1, welding rod 6 or guiding device 36 has to be set at an angle in end zone 5, such angle being determined by the obliquely extending surface 67, so that welding rod 6 or guiding device 36 are deflected in end zone 5 in a manner such that welding rod 6 can flawlessly enter bore 25 of contact socket 24 or bore 18 of transition piece 17.

What is accomplished by the angled feed of welding rod 6 to bore 25 of contact socket 24 is that at least one permanent contact area 43 is created within contact socket 24 because welding rod 6 is always deflected on the surface of bore 25 of contact socket 24 in the direction of center axis 27 of bore 25. However, it is possible that another contact area 44 is produced in the region of the inlet to bore 25 because of a bend 45 caused by welding rod 6. Now, when the two contact areas 43, 44 are connected, a straight line 46 is obtained which is represented by a dot-two-dash-line. The straight line 46 resulting from the two contact areas 43, 44 has the angle 47 relative to longitudinal center axis 21 and thus relative to center axis 27 if bore 25. Forced contacting of welding rod 6 with contact socket 24 is obtained by such angular arrangement of welding rod 6 or through the bend of welding rod 6 caused by such angular arrangement in end zone 5.

Finally, for the sake of good order it is pointed out that individual structural components and assemblies are shown in the drawings disproportionally and distorted in terms of scale for better understanding of the invention.

Most of all, the designs shown in the individual FIGS. 1 to 3, 4, 5, 6, 7 and 8 may form the object of independent solutions as defined by the invention. The problems and solutions as defined in this regard by the invention are specified in the descriptions of the details of said figures.

LIST OF REFERENCE NUMERALS

1 Welding torch
2 Supply piece
3 Insulating ring
4 Outer jacketing
5 End zone
6 Welding rod
7 Individual part
8 Individual part
9 Individual part
10 Supply tube
11 Insulating layer
12 Groove
13 Cooling tube
14 Groove
15 Insulating piece
16 Gas nozzle
17 Transition piece
18 Bore
19 Bore
20 Center axis
21 Longitudinal center axis
22 Part zone
23 Inside thread
24 Contact socket
25 Bore
26 Diameter
27 Center axis
28 Bore
29 Feed device
30 Copper tube
31 Symmetry axis
32 Surface
33 Inside surface
34 Contact area
35 Angle
36 Guiding device
37 Outer cover
38 Inside diameter
39 Additional tube
40 Additional tube
41 Connecting tube
42 Outlet opening
43 Contact area
44 Contact area
45 Bend
46 Straight Line
47 Angle
48 Protective gas cover 49 Electric arc
50 Gas
51 Interior space
52 Closing plate
53 Bore
54 Inlet opening
55 Angle
56 Hand welding torch
57 Connecting device
58 Insulating layer
59 Curvature
60 Spacing
61 Hollow space
62 Connecting tube
63 Intermediate piece
64 Bend
65 Angle
66 Contact area
67 Surface

What is claimed is:

1. A welding torch having a centrally extending longitudinal axis and comprising
   (a) a supply tube for a welding rod,
   (b) an exchangeable contact socket defining a longitudinally extending bore having a center axis,
      (1) the supply tube leading directly to the contact socket,
   (c) a separate feed device in the supply tube for feeding the welding rod into the bore of the contact socket, the separate feed device having
      (1) a central longitudinal axis extending parallel to the centrally extending longitudinal axis of the welding torch and offset therefrom,
      (2) a constant inner diameter throughout its length, and
      (3) an end extending to the contact socket and deformed obliquely relative to the center axis of the contact socket bore towards the centrally extending longitudinal axis of the welding torch for deflecting the welding rod rectilinearly at an angle transversely to the contact socket bore whereby the welding rod contacts the contact socket at a predetermined area in the contact socket bore, and
   (d) an exchangeable guiding device coaxially arranged in the feed device for guiding the welding rod into the contact socket bore,
      (a) the contact socket and the guiding device being exchangeable to conform the inner diameter of the contact socket bore and of the guiding device to the outer diameter of different welding rods.

2. The welding torch of claim 1, wherein the center axis of the contact socket is aligned with the centrally extending longitudinal axis of the welding torch.

3. The welding torch of claim 1, wherein the guiding device is comprised of a coil spring.

4. The welding torch of claim 1, wherein the guiding device is comprised of an elastic plastic material.

5. The welding torch of claim 1, wherein the guiding device has an outer diameter which is smaller than an inner diameter of the feed device.

6. The welding torch of claim 1, wherein the guiding device has an inner diameter which is at least equal to an outer diameter of the welding rod.

7. The welding torch of claim 1, wherein the deflected welding rod forms two contact areas with the contact socket in the contact socket bore, a straight line connecting the two contact areas enclosing an angle with the centrally extending longitudinal axis of the welding torch.

8. The welding torch of claim 1, further comprising a transition piece connecting the feed device to the contact socket.

9. The welding torch of claim 8, wherein the transition piece has two bores.

10. The welding torch of claim 9, wherein the contact socket is connected to one of the bores in the transition piece.

11. The welding torch of claim 10, wherein the one bore in the transition piece has a center axis aligned with the centrally extending longitudinal axis of the welding torch.

12. The welding torch of claim 10, wherein the one bore extends along a portion of the transition piece, the one bore having an inner thread into which the contact socket is screwed.

13. The welding torch of claim 10, wherein the feed device extends at least to the other one of the bores in the transition piece.

14. The welding torch of claim 13, wherein the feed device extends into the other one of the bores in the transition piece.

15. The welding torch of claim 13, wherein the feed device ends at the other one of the bores in the transition piece.

16. The welding torch of claim 15, further comprising a closing plate for the other bore in the transition piece.

17. The welding torch of claim 16, wherein the closing plate has bores.

18. The welding torch of claim 15, wherein the welding rod is disposed freely in the other bore in the transition piece between the closing plate and the contact socket bore.

19. The welding torch of claim 18, wherein the freely disposed welding rod encloses an angle with the centrally extending longitudinal axis of the welding torch in the other bore in the transition piece and forms two contact areas with the contact socket in the contact socket bore, a straight line connecting the two contact areas enclosing an angle with the centrally extending longitudinal axis of the welding torch.

20. The welding torch of claim 13, further comprising an intermediate feed device piece arranged ahead of the other bore in the transition piece.

21. The welding torch of claim 13, wherein the two bores in the transition piece enclose an angle with each other, and one of the bores has a center axis aligned with the centrally extending longitudinal axis of the welding torch.

22. The welding torch of claim 21, wherein the transition piece has a surface extending at an angle relative to the center axis of the one bore.

* * * * *